C. VERPLOEGH.
VEHICLE.
APPLICATION FILED APR. 27, 1917.
1,279,794.
Patented Sept. 24, 1918.
2 SHEETS—SHEET 1.
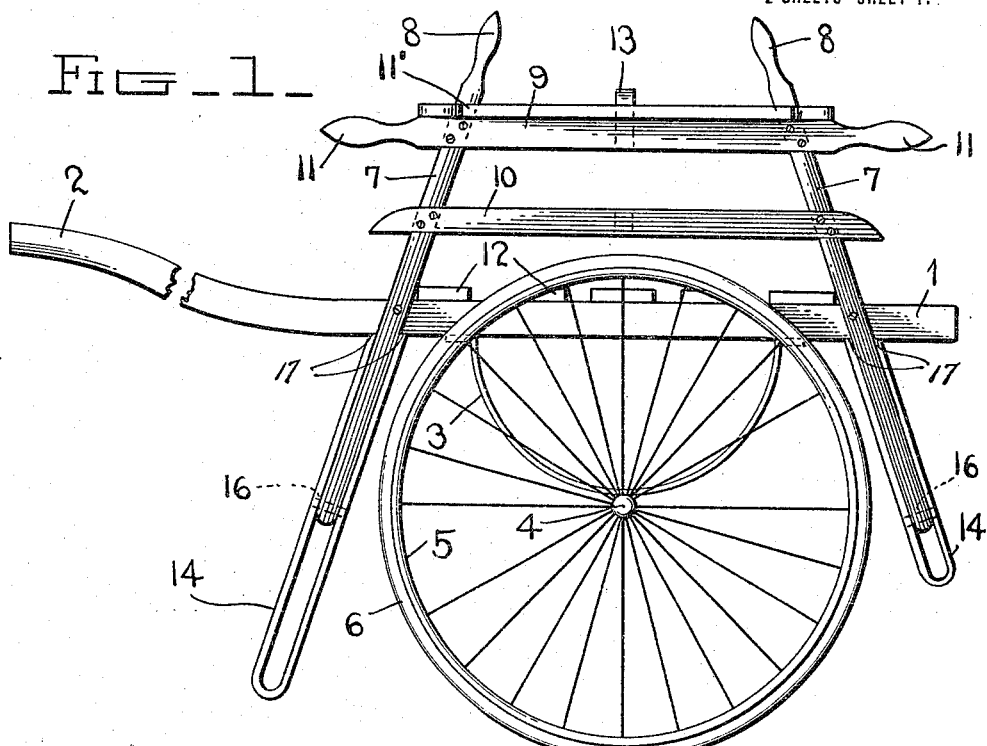
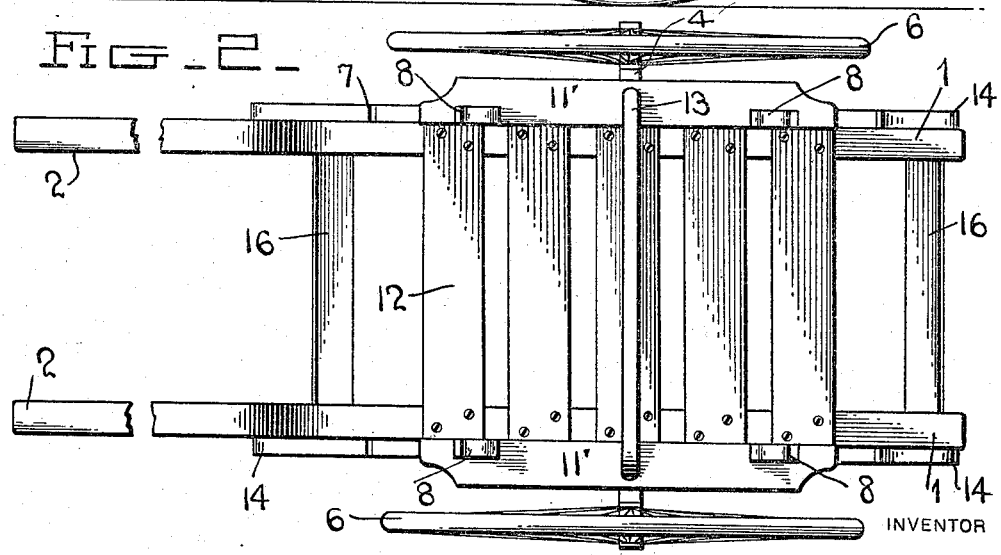
WITNESSES
L. B. James
J. F. Schrott
INVENTOR
Christian Verploegh
BY Richard Bowen
ATTORNEY C. VERPLOEGH.
VEHICLE.
APPLICATION FILED APR. 27, 1917.
1,279,794.
Patented Sept. 24, 1918.
2 SHEETS—SHEET 2.
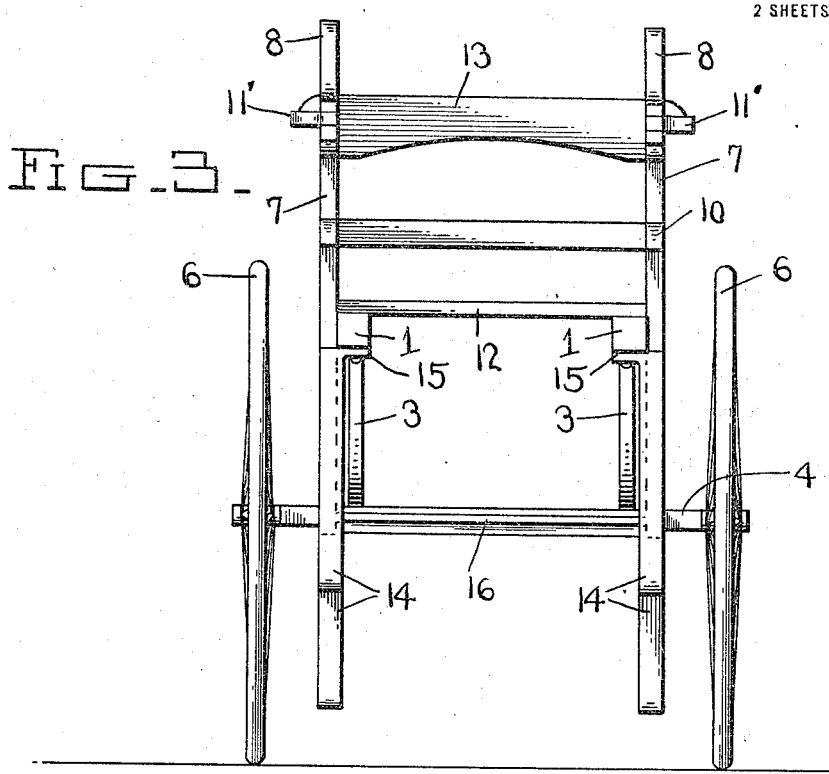
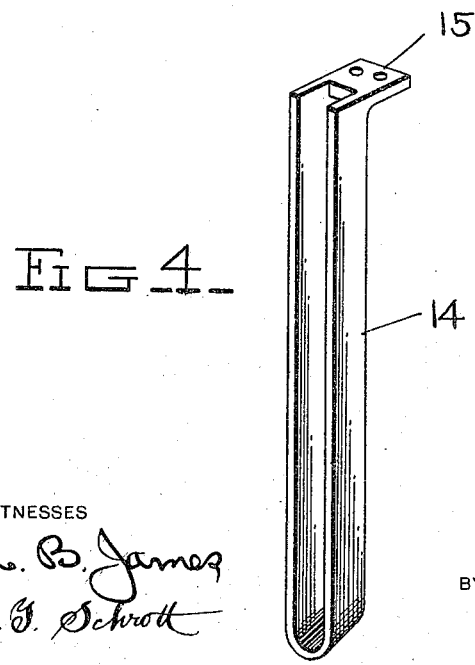
WITNESSES
L. B. James
J. T. Schrott
INVENTOR
Christian Verploegh
BY
ATTORNEY

UNITED STATES PATENT OFFICE.

CHRISTIAN VERPLOEGH, OF PELLA, IOWA.

VEHICLE.

1,279,794.  Specification of Letters Patent.  Patented Sept. 24, 1918.

Application filed April 27, 1917. Serial No. 164,974.

*To all whom it may concern:*

Be it known that I, CHRISTIAN VERPLOEGH, a citizen of the Netherlands, residing at Pella, in the county of Marion and State of Iowa, have invented certain new and useful Improvements in Vehicles, of which the following is a specification.

My invention relates to improvements in vehicles, and it consists in the constructions, arrangements, and combinations herein described and claimed.

An object of my invention is to provide a wheeled vehicle adapted more particularly for use as a child's cart or sulky, and it comprises a novel arrangement of bracing and supporting members whereby seats and backrests are provided, suitable shafts being formed on the ends of the main supporting beams whereby the cart may be pulled along.

Other objects and advantages will appear from the following specification, reference being had to the accompanying drawing in which:

Figure 1 is a side elevation of a sulky constructed in accordance with the principles of my invention;

Fig. 2 is a plan view of the sulky;

Fig. 3 is a rear elevation thereof, and

Fig. 4 is a detail perspective view of one of the leg members.

In carrying out my invention, I provide a pair of main supporting beams 1 which are preferably made of hickory wood which are bent upwardly and outwardly to form shafts 2 which may be grasped when it is desired to propel the sulky.

Springs 3 secured beneath the beams 1, support the axle 4 of a pair of wheels 5. The wheels 5 are rubber tired as at 6 so that the sulky may move noiselessly over the ground and that the shocks of the travel of the sulky over rough ground may be largely absorbed.

A pair of diagonally extended frame members 7 are disposed at approximately equal distances at either sides of the wheels 5. It will be observed in Fig. 1 that the frame members are upwardly convergent and terminate in handles 8. A pair of brace members 9 and 10 span the upper portions of the frame members 7, the brace members 9 being also provided with handles 11 at their ends which are adapted to be grasped when the sulky is mounted. A ledge 11¹ is secured to the brace members 9 and to the adjacent portions of the frame members 7, the primary purpose of the ledge 11' being to add rigidity to the various members to which it is secured as well as to provide an arm rest.

Slats 12 are secured upon the beams 1 and provide seats at either side of a pair of transverse members 13 which form back rests for the occupants of the sulky. As before stated the handles 11 are grasped in mounting the sulky, and when it is propelled over the ground, the handles 8 are grasped to enable the occupants of the sulky to maintain their seats thereon.

The lower ends of the frame members 7 are sheathed in metallic foot pieces 14 which are provided with flanges 15 by means of which the foot pieces are secured beneath the beams 1. The foot pieces 14 are formed from channel members, thus being substantially U shaped in cross section, while the lower ends of the foot pieces are closed and present rounded constructions, thus being substantially U shaped, as will be apparent by an inspection of Figs. 1 and 4. The upper ends of these foot pieces are of a diagonal arrangement, as illustrated at 17, thus compensating for the diverging construction of the lower end of the diagonally extending member 7, thus permitting the upper end of the foot pieces to bear firmly upon the under surface of the main supporting beams 1, thus presenting a broad bearing for the flanges 15 for permitting the same to be firmly secured to the beams 1. A step 16 is secured between the lower ends of each of the frame members 7, the obvious purpose of the steps 16 being to afford a footing upon which the occupants mount the sulky.

It will be observed in Fig. 1 that the metallic foot 14 nearest the shafts 2 is somewhat longer than the foot 14 upon the other frame member 7. The former foot 14 is adapted to act as a rest for the sulky, it being obvious that when the sulky is moved over the ground the natural tendency will be to elevate the shafts 2 and therefore the necessity of making the feet 14 at the front of the sulky shorter.

While the construction and arrangement of the device is that of a generally preferred form, obviously modifications and changes may be made without departing from the spirit of the invention or the scope of the appended claims.

I claim:

1. In a device of the class described, the combination of a pair of supporting beams, diagonally extending members fixedly secured to said supporting beams, said diagonally extending members having handle portions at their upper ends, steps supported adjacent the lower ends of said diagonal members, brace members fixedly secured to said diagonally extending members adjacent the handles thereof, a plurality of said brace members projecting for considerable distance beyond said diagonal extending members and having handle portions formed thereon, slats secured to said supporting beams, thus forming a platform, said handle portions being above said steps, thus allowing a person to grip the handle portion of a brace member and step onto the step to facilitate mounting onto the platform, after which action, the handle portion of one of the diagonally extending members may be gripped for preventing the occupant from being thrown upon the platform.

2. In a device of the class described, the combination of a pair of side beams, means for supporting said side beams, a receiving portion carried upon said side beams and including extending members projecting below the side beams, said members diverging toward their lower ends, foot pieces comprising channeled structures which are substantially U shaped in cross section, thus being receivable upon the projecting ends of said diagonally extending members, said foot pieces having rounded closed lower ends, thus being substantially U shaped at their lower ends to prevent wear upon the supporting surface, the upper ends of said foot pieces being beveled off in a diagonal manner to fit firmly upon the under surfaces of said beams, flanges formed upon the upper end of said foot pieces, said flanges bearing upon said beams, means for securing said flanges to said beams, thus causing the foot pieces to depend for considerable distances below the lower ends of the extending members for supporting the device when the same is not in use.

3. In a device of the class described, the combination of a pair of side beams, means for supporting said side beams, slats carried upon said beams, extending members secured to said side beams and projecting thereabove and therebelow, the upper end of said extending members terminating in handles, bracing members secured to said extending members adjacent the upper ends thereof, a plurality of said bracing members terminating in projecting handles formed beyond the extending members, foot pieces formed of channeled members which are substantially U shaped, the lower ends of said foot pieces being closed and presenting a rounded construction also being substantially U shaped, thus permitting the foot pieces to be positioned on the projecting lower ends of said extending members, flanges extending from said foot pieces adjacent the upper ends thereof, said flanges being adapted to bear the lower surfaces of said beams, securing means passing through said flanges, thus permiting the flanges to support the device from tilting too far when the same is not in use, and steps connected to said foot pieces.

In testimony whereof I affix my signature in presence of two witnesses.

CHRISTIAN VERPLOEGH.

Witnesses:
DIELIS VAN ZARITE,
HURBERT DEN HURFOY.

Copies of this patent may be obtained for five cents each, by addressing the "Commissioner of Patents, Washington, D. C."